US012591334B2

(12) United States Patent (10) Patent No.: US 12,591,334 B2

Lin (45) Date of Patent: Mar. 31, 2026

(54) TOUCH PANEL AND ELECTRONIC DEVICE

(71) Applicant: E Ink Holdings Inc., Hsinchu (TW)

(72) Inventor: Chun-Fu Lin, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/396,612

(22) Filed: Dec. 26, 2023

(65) Prior Publication Data

US 2024/0241602 A1 Jul. 18, 2024

(30) Foreign Application Priority Data

Jan. 18, 2023 (TW) ................................. 112102291

(51) Int. Cl.
G06F 3/041 (2006.01)
G06F 3/044 (2006.01)

(52) U.S. Cl.
CPC .......... G06F 3/0418 (2013.01); G06F 3/0443 (2019.05); G06F 3/0446 (2019.05); G06F 2203/04111 (2013.01)

(58) Field of Classification Search
CPC .... G06F 3/0418; G06F 3/0443; G06F 3/0446; G06F 3/0448; G06F 2203/04111
See application file for complete search history.

(56) References Cited

U.S. PATENT DOCUMENTS 9,007,333 B1 * 4/2015 Wilson ................... G06F 3/0418
345/174
10,235,002 B2 3/2019 Church et al.

10,338,758 B2 7/2019 Choi et al.
2014/0218335 A1 * 8/2014 Teranishi .............. G06F 3/0412
345/174
2014/0347299 A1 * 11/2014 Lu .......................... G06F 3/0446
345/173
2015/0293624 A1 * 10/2015 Chen ...................... G06F 3/041
345/174
2017/0038864 A1 * 2/2017 Kuo ...................... G06F 3/0448
2017/0075491 A1 * 3/2017 Ye .......................... G06F 3/0443
(Continued)

FOREIGN PATENT DOCUMENTS

CN 115268702 11/2022
TW 201445621 12/2014
(Continued)

*Primary Examiner* — Christopher E Leiby
(74) *Attorney, Agent, or Firm* — JCIPRNET

(57) ABSTRACT

An electronic device includes a display panel having a display surface and a touch panel located above the display surface. The touch panel includes a substrate, first electrode series, and second electrode series. The first electrode series are disposed on the substrate and each include first electrode portions and connection portions each connecting adjacent two first electrode portions in series in a first direction. The second electrode series are disposed on the substrate and each include second electrode portions and second connection portions each connecting adjacent two second electrode portions in series in a second direction intersecting the first direction. Each first connection portion partially overlaps one second connection portion. The first electrode portions and the second electrode portions are disposed in parallel on the substrate. An area of each second electrode portion is larger than an area of each first electrode portion.

13 Claims, 2 Drawing Sheets

10

(56)         References Cited

U.S. PATENT DOCUMENTS

| | | | | |
|---|---|---|---|---|
| 2017/0293362 A1* | 10/2017 | Heim | .................... | G06F 3/0443 |
| 2018/0224968 A1* | 8/2018 | Church | ................. | G06F 3/0448 |
| 2020/0073512 A1* | 3/2020 | Jiang | .................... | G06F 3/0445 |
| 2020/0125203 A1* | 4/2020 | Kim | ...................... | G06F 3/0443 |
| 2023/0000413 A1* | 1/2023 | Batzer | ...................... | A61B 5/28 |
| 2023/0185412 A1* | 6/2023 | Gong | ................... | G06F 3/0446 |
| | | | | 345/174 |
| 2023/0195259 A1* | 6/2023 | Deng | ................... | G06F 3/0448 |
| | | | | 345/174 |

FOREIGN PATENT DOCUMENTS

| | | |
|---|---|---|
| TW | I467457 | 1/2015 |
| TW | I632503 | 8/2018 |
| TW | I668615 | 8/2019 |
| TW | I676928 | 11/2019 |
| TW | I720722 | 3/2021 |
| TW | 202143006 | 11/2021 |

* cited by examiner

TOUCH PANEL AND ELECTRONIC DEVICE

CROSS-REFERENCE TO RELATED APPLICATION

This application claims the priority benefit of Taiwanese application No. 112102291, filed on Jan. 18, 2023. The entirety of the above-mentioned patent application is hereby incorporated by reference herein and made a part of this specification.

BACKGROUND

Technical Field

The disclosure relates to an electronic device. Particularly, the disclosure relates to a touch panel and an electronic device.

Description of Related Art

Touch technology has been widely used in various electronic devices. Technology of a touch panel equipped with other electronic members, such as a display panel, has been developing vigorously. To achieve relatively proper sensing correctness, it is necessary to reduce erroneous sensing caused by signals of other electronic members.

SUMMARY

The disclosure provides a touch panel that has a relatively high signal-to-noise ratio (SNR, a ratio of intensity of real sensing signals to intensity of noise signals) and may provide favorable touch sensing.

The disclosure provides an electronic device having a touch panel with high touch correctness.

According to an embodiment of the disclosure, a touch panel includes a substrate, a plurality of first electrode series, and a plurality of second electrode series. The plurality of first electrode series are disposed on the substrate. Each of the plurality of first electrode series includes a plurality of first electrode portions and a plurality of first connection portions. Each of the plurality of first connection portions connects adjacent two of the plurality of first electrode portions in series in a first direction. The plurality of second electrode series are disposed on the substrate. Each of the plurality of second electrode series includes a plurality of second electrode portions and a plurality of second connection portions. Each of the plurality of second connection portions connects adjacent two of the plurality of second electrode portions in series in a second direction. The first direction intersects the second direction. Each of the plurality of first connection portions partially overlaps one of the plurality of second connection portions. The plurality of first electrode portions and the plurality of second electrode portions are disposed in parallel on the substrate. An area of each of the plurality of second electrode portions is larger than an area of each of the first electrode portions.

According to an embodiment of the disclosure, an electronic device includes a display panel and a touch panel. The display panel has a display surface. The touch panel is located above the display surface. The touch panel includes a substrate, a plurality of first electrode series, and a plurality of second electrode series. The plurality of first electrode series are disposed on the substrate. Each of the plurality of first electrode series includes a plurality of first electrode portions and a plurality of first connection portions. Each of the plurality of first connection portions connects adjacent two of the plurality of first electrode portions in series in a first direction. The plurality of second electrode series are disposed on the substrate. Each of the plurality of second electrode series includes a plurality of second electrode portions and a plurality of second connection portions. Each of the plurality of second connection portions connects adjacent two of the plurality of second electrode portions in series in a second direction. The first direction intersects the second direction. Each of the plurality of first connection portions partially overlaps one of the plurality of second connection portions. The plurality of first electrode portions and the plurality of second electrode portions are disposed in parallel on the substrate. An area of each of the plurality of second electrode portions is larger than an area of each of the first electrode portions.

In an embodiment of the disclosure, the area of each of the plurality of second electrode portions is 2±0.2 times the area of each of the first electrode portions.

In an embodiment of the disclosure, each of the plurality of first electrode portions includes a first central pattern and two first end patterns. The two first end patterns are located on opposite sides of the first central pattern in the first direction. Each of the two first end patterns is connected between the first central pattern and one of the plurality of first connection portions. A width of each of the two first end patterns is gradually reduced outward from the first central pattern along the first direction. A width of the first central pattern is smaller than a maximum width of each of the two first end patterns.

In an embodiment of the disclosure, the width of the first central pattern is 0.75 time the maximum width of each of the two first end patterns.

In an embodiment of the disclosure, the two first end patterns are arranged symmetrically about the first central pattern.

In an embodiment of the disclosure, the width of each of the two first end patterns is larger than a width of the corresponding first connection portion.

In an embodiment of the disclosure, the two first end patterns are respectively adjacent to different second electrode series.

In an embodiment of the disclosure, each of the plurality of second electrode portions includes a second central pattern and two second end patterns. The two second end patterns are located on opposite sides of the second central pattern in the second direction. Each of the two second end patterns is connected between the second central pattern and one of the plurality of second connection portions. A width of each of the two second end patterns is gradually reduced outward from the second central pattern along the second direction.

In an embodiment of the disclosure, the second central pattern includes two expanded segments adjacent to the two second end patterns and a reduced segment located between the two expanded segments. A width of the reduced segment is smaller than a width of the two expanded segments.

In an embodiment of the disclosure, each of the plurality of first electrode portions includes a first central pattern and a first end pattern located between the first central pattern and the corresponding first connection portion. Each of the plurality of second electrode portions includes a second central pattern and a second end pattern located between the second central pattern and the corresponding second connection portion. The first end pattern is spaced from the adjacent second end pattern by a first distance. The first central pattern is spaced from the adjacent second central pattern by a second distance. The first distance is smaller than the second distance.

Based on the foregoing, in an embodiment of the disclosure, the touch panel and the electronic device having a touch panel adopt the touch electrode design of first electrode series and second electrode series. In an embodiment of the disclosure, there is an apparent difference between the areas of the first electrode portions of the first electrode series and the second electrode portions of the second electrode series. The touch panel adopts the second electrode portions having a relative small area as the reading electrodes, helping reduce the noise intensity to achieve favorable sensing.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
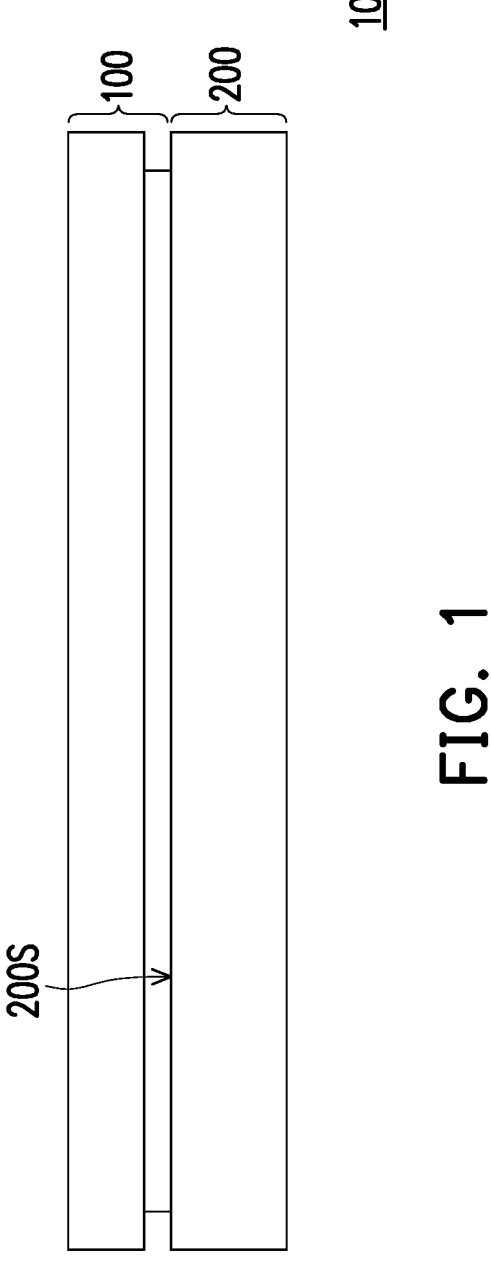
FIG. 1 is a schematic view of an electronic device of an embodiment of the disclosure.

FIG. 1 is a schematic view of an electronic device of an embodiment of the disclosure. In FIG. 1, an electronic device 10 includes a touch panel 100 and a display panel 200. The display panel 200 has a display surface 200S, and the touch panel 100 is located above the display surface 200S. Display light provided by the display panel 200 may travel toward the touch panel 100 and pass through the touch panel 100 to be viewed the user. When the user views the screen, the touch panel 100 is located between the user and the display panel 200, and the user may perform a touch operation on the touch panel 100 to control the electronic device 10 to perform a designated function. In some embodiments, the touch panel 100 is a capacitive touch panel with a single-layer electrode, and uses the single-layer electrode to form a reading electrode (also referred to as an Rx electrode) and a driving electrode (also referred to as a Tx electrode) and utilizes the change in the capacitance value between the reading electrode and the driving electrode as a touch sensing signal. In some embodiments, the display panel 200 may be a liquid crystal display panel, an electronic paper display panel, an organic light-emitting display panel, or other display panels. The touch panel 100 may be disposed on the display panel 200 by adopting attachment. Disposing the touch panel 100 to be close to the display panel 200 may cause interference between signals of each other. For example, when the display panel 200 is an electronic paper display panel, the process of turning pages by the electronic paper display panel may generate apparent noise on the touch panel 100 and affect touch correctness of the touch panel 100.

Figure 2:
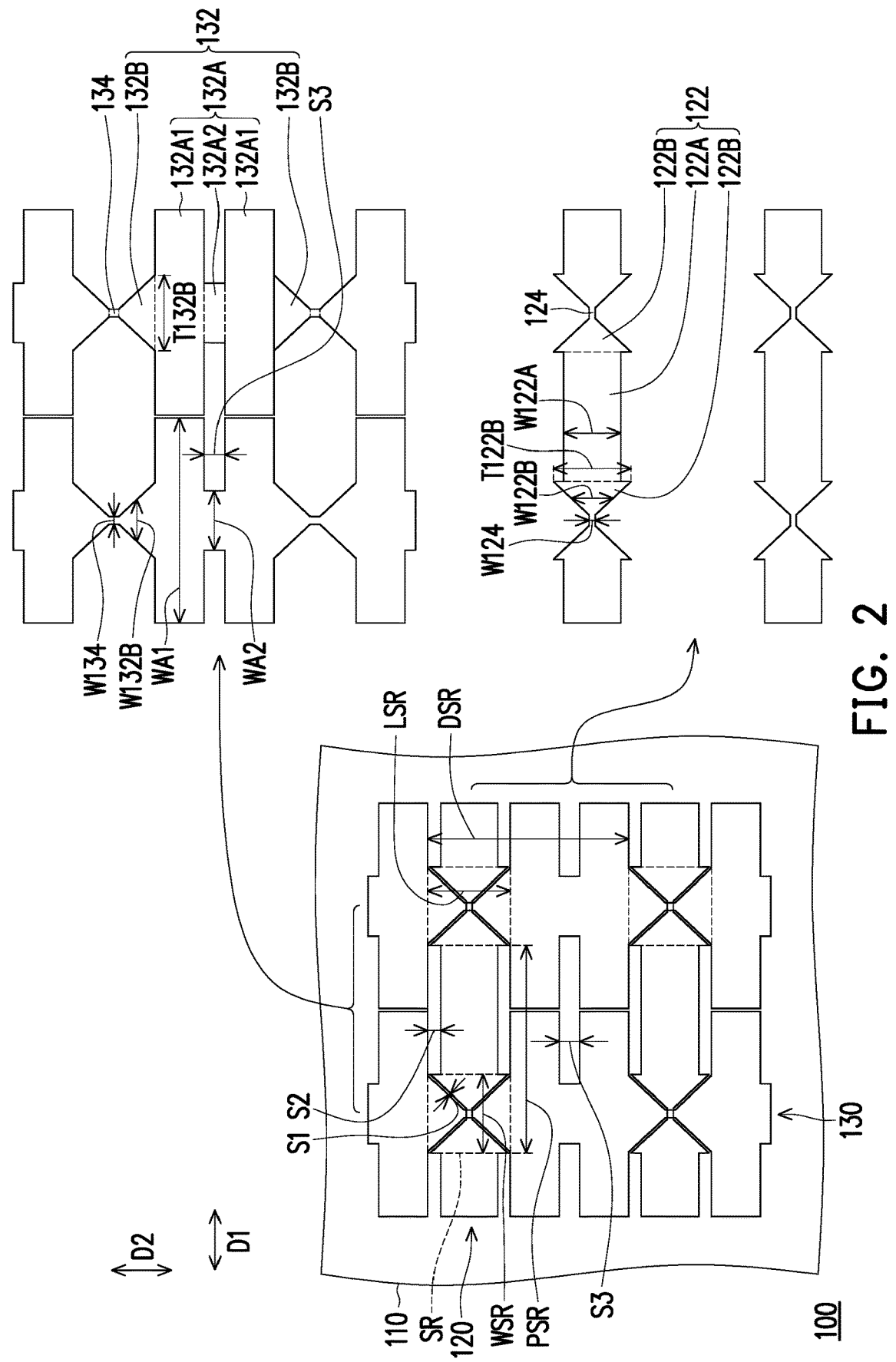
FIG. 2 is a schematic view of a touch panel of an embodiment of the disclosure.

FIG. 2 is a schematic view of a touch panel of an embodiment of the disclosure. The touch panel 100 of FIG. 2 may be an embodiment of the touch panel 100 of FIG. 1, and includes a substrate 110, a plurality of first electrode series 120, and a plurality of second electrode series 130. The first electrode series 120 and the second electrode series 130 are disposed on the substrate 110. Each of the plurality of first electrode series 120 includes a plurality of first electrode portions 122 and a plurality of first connection portions 124. Each of the plurality of first connection portions 124 connects adjacent two of the plurality of first electrode portions 122 in series in a first direction D1. Each of the plurality of second electrode series 130 includes a plurality of second electrode portions 132 and a plurality of second connection portions 134. Each of the plurality of second connection portions 134 connects adjacent two of the plurality of second electrode portions 132 in series in a second direction D2. In some embodiments, the first direction D1 intersects the second direction D2, and each of the plurality of first connection portions 124 intersects one of the plurality of second connection portions 134. Specifically, each of the plurality of first connection portions 124 partially overlaps one of the plurality of second connection portions 134. The sequence of stacking the first connection portions 124 and the second connection portions 134 may be adjusted depending on the design, and the sequence of stacking the first connection portions 124 and the second connection portions 134 is not distinguished in FIG. 2. In some embodiments, an insulating material (not shown) is further disposed between each of the plurality of first connection portions 124 and the corresponding second connection portion 134 to ensure electrical independence, instead of direct contact and conduction, between the first electrode series 120 and the second electrode series 130.

In some embodiments, the first electrode series 120 may be electrically connected to the reading circuit unit of the driving control circuit (not shown), and the second electrode series 130 may receive the driving control signal provided by the driving control circuit. Before the presence of a touch action, a substantially constant mutual capacitance is maintained between the first electrode portion 122 and the second electrode portion 132. When the user performs a touch operation on the touch panel 100, the capacitance on the first electrode series 120 may change in response to the touch operation, and is read by the control circuit along with the driving control signal on the second electrode series 130 to generate a touch signal. Here, the first electrode portion 122 of the first electrode series 120 may be referred to as a reading electrode or an Rx electrode, and the second electrode portion 132 of the second electrode series 130 may be referred to as a driving electrode or a Tx electrode. When the touch panel 100 is integrated with the display panel or other electronic members, the signal from the display panel or other electronic members may cause disturbance with the capacitance on the reading electrode, generating such noise that is increasing likely to occur as the area of the reading electrode increases. As a result, as the area of the reading electrode increases, the signal-to-noise ratio (the ratio of the real signal to the noise) of the sensed signal decreases, resulting in false alarm points or inaccurate sensing.

In this embodiment, the plurality of first electrode portions 122 and the plurality of second electrode portions 132 are disposed in parallel on the substrate 110, and an area of each of the plurality of second electrode portions 132 is larger than an area of each of the first electrode portions 122. In other words, the touch panel 100 of this embodiment adopts a design in which the area of the reading electrode is smaller than the area of the driving electrode. Since the first electrode portion 122 (reading electrode) has a relatively small area, the first electrode portion 122 has relatively small amount of sensitivity to noise caused by non-touch operations, which helps improve the signal-to-noise ratio, realizing relatively high sensing correctness.

Further, the area of each of the plurality of second electrode portions 132 may be 2±0.2 times the area of each of the first electrode portions 122. As shown in FIG. 2, each of the plurality of first electrode portions 122 is located between two first connection portions 124 and has a double-arrow-shaped pattern, for example. The double-arrow pattern is approximately parallel to the first direction D1 and points to the first connection portions 124 on two sides of the first electrode portion 122, respectively.

For example, each of the plurality of first electrode portions 122 includes a first central pattern 122A and two first end patterns 122B. The two first end patterns 122B are located on opposite sides of the first central pattern 122A in the first direction D1. Each of the two first end patterns 122B is connected between the first central pattern 122A and one of the plurality of first connection portions 124. The first central pattern 122A may be understood as an arrow body of the double-arrow pattern, and the two first end patterns 122B may be understood as arrows of the double-arrow pattern. As shown in FIG. 2, the two first end patterns 122B are respectively adjacent to different second electrode series 130.

In addition, a width W122B of each of the two first end patterns 122B is gradually reduced outward from the first central pattern 122A along the first direction D1. Each of the two first end patterns 122B has a maximum width T122B adjacent to the first central pattern 122A, and a width W122A of the first central pattern 122A is smaller than the maximum width T122B of each of the two first end patterns 122B. In some embodiments, the width W122A of the first central pattern 122A is 0.75 time the maximum width T122B of each of the two first end patterns 122B.

As shown in FIG. 2, the two first end patterns 122B are arranged symmetrically about the first central pattern 122A. In other words, the central line of the first central pattern 122A parallel to the first direction D1 is also the central line of the two first end patterns 122B. Nonetheless, in other embodiments, the two first end patterns 122B are not necessarily aligned with the first central pattern 122A. In addition, the width W122B of each of the two first end patterns 122B is larger than a width W124 of the corresponding first connection portion 124. In some embodiments, the width W124 of the first connection portion 124 may be the minimum width that allows the adjacent first electrode portion 122 to be electrically connected and achievable by the manufacturing capability.

In the second electrode series 130, each of the plurality of second electrode portions 132 includes a second central pattern 132A and two second end patterns 132B. The two second end patterns 132B are located on opposite sides of the second central pattern 132A in the second direction D2. In the second electrode portion 132, each of the two second end patterns 132B is connected between the second central pattern 132A and one of the plurality of second connection portions 134, and a width W132B of each of the two second end patterns 132B is gradually reduced outward from the second central pattern 132A along the second direction D2. In addition, the width W132B of each of the two second end patterns 132B may be larger than a width W134 of the second connection portion 134. The width W134 of the second connection portion 134 may be the minimum width that allows the adjacent second electrode portion 132 to be electrically connected and achievable by the manufacturing capability.

As shown in FIG. 2, the two second end patterns 132B are respectively adjacent to different first electrode series 120. The first end patterns 122B of the first electrode series 120 and the second end patterns 132B of the second electrode series 130 are disposed adjacent to each other to form a square induction portion SR. Each of the first connection portions 124 intersects the corresponding second connection portion 134 approximately at the center of one of the square induction portions SR. In some embodiments, in the first direction D1, a width WSR of the square induction portion SR is apparently smaller than a spacing PSR between the square induction portions SR. Similarly, in the second direction D2, a width LSR of the square induction portion SR is apparently smaller than a spacing DSR between the square induction portions SR. The width WSR in the first direction D1 may be approximately the same as the width LSR in the second direction D2, and the spacing PSR in the first direction D1 may be approximately the same as the spacing DSR in the second direction D2. In some implementations, the spacing PSR in the first direction D1 and the spacing DSR in the second direction D2 are approximately 6 mm, for example, to be adapted for the user to directly touch with fingers. The first end patterns 122B and the adjacent second end patterns 132B define a square induction portion SR and are spaced by a first distance S1. The first central pattern 122A and the adjacent second central pattern 132A are located outside the square induction portion SR and spaced by a second distance S2. The first distance S1 is smaller than the second distance S2.

In this embodiment, the second central pattern 132A includes two expanded segments 132A1 adjacent to the two second end patterns 132B and a reduced segment 132A2 between the two expanded segments 132A1, and a width WA2 of the reduced segment 132A2 is smaller than a width WA1 of the two expanded segments 132A1. In this way, in the first direction D1, the distance between the expanded segments 132A1 of two adjacent second electrode portions 132 is smaller than the distance between the reduced segments 132A2 of two adjacent second electrode portions 132. In the first direction D1, the distance between the expanded segments 132A1 of two adjacent second electrode portions 132 may be the distance that ensures the two adjacent second electrode portions 132 are spaced apart from each other in the first direction D1 and that is within the manufacturing capacity, to ensure electrical independence between the second electrode series 130.

In some embodiments, the two expanded segments 132A1 and the reduced segment 132A2 of the second central pattern 132A are arranged symmetrically in the second direction D2, and the second end patterns 132B and the second central pattern 132A are also aligned with each other, so each of the second electrode portions 132 is symmetrically arranged along the second direction D2, but not limited thereto. In addition, the reduced segment 132A2 of the second central pattern 132A may separate the two expanded segments 132A1, such that the two expanded segments 132A1 are spaced from each other by a third distance S3. In some embodiments, the third distance S3 and the width WA2 of the reduced segment 132A2 may be adjusted depending on configuration of the areas of the first electrode portion 122 and the second electrode portion 132. For example, in this embodiment, the area of the first electrode portion 122 and the second electrode portion 132 is approximately 1:2, and the designer may adjust the third distance S3 and the width WA2 of the reduced segment 132A2 according to this design specification. In addition, in some embodiments, the width WA2 of the reduced segment 132A2 may be 0.75 time the maximum width T132B of the second end pattern 132B.

In simulated experiments, it could be found that under specified settings of sensing resolution (number of touch sensing points per unit area), when the area ratio of the reading electrode to the driving electrode was set to 1:1, the signal-to-noise ratio of the touch panel was approximately 13.29%. Comparatively, under the same settings of sensing resolution, when the reading electrode and the driving electrode were designed into the layout shown in FIG. 2, the signal-to-noise ratio of the touch panel was approximately 21.61%. As can be seen accordingly, the electrode configuration of the touch panel 100 helps improve the signal-to-noise ratio and realize correct touch sensing.

In summary of the foregoing, in the touch panel of an embodiment of the disclosure, the area of the first electrode portion (reading electrode) of the first electrode series is smaller than that of the second electrode portion (driving electrode) of the second electrode series. The area of the reading electrode may be approximately ½ of the area of the driving electrode. Such an electrode pattern design reduces intensity of noise read by the reading electrode and enhance the real sensing signal, accordingly increasing the induction capacity and reducing the signal-to-noise ratio. As a result, in an embodiment of the disclosure, the touch panel and the electronic device having such a touch panel may have favorable touch sensing correctness.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch panel comprising:
a substrate;
a plurality of first electrode series disposed on the substrate, each of the plurality of first electrode series comprising a plurality of first electrode portions and a plurality of first connection portions, each of the plurality of first connection portions connecting adjacent two of the plurality of first electrode portions in series in a first direction; and
a plurality of second electrode series disposed on the substrate, each of the plurality of second electrode series comprising a plurality of second electrode portions and a plurality of second connection portions, each of the plurality of second connection portions connecting adjacent two of the plurality of second electrode portions in series in a second direction, wherein the first direction intersects the second direction, and each of the plurality of first connection portions partially overlaps one of the plurality of second connection portions,
wherein the plurality of first electrode portions and the plurality of second electrode portions are disposed in parallel on the substrate, and an entirety of an area of each of the plurality of second electrode portions is larger than an entirety of an area of each of the first electrode portions,
wherein the entirety of the area of each of the plurality of second electrode portions is 2±0.2 times the entirety of the area of each of the first electrode portions.

2. The touch panel according to claim 1, wherein each of the plurality of first electrode portions comprises a first central pattern and two first end patterns, the two first end patterns are located on opposite sides of the first central pattern in the first direction, each of the two first end patterns is connected between the first central pattern and one of the plurality of first connection portions, a width of each of the two first end patterns is gradually reduced outward from the first central pattern along the first direction, and a width of the first central pattern is smaller than a maximum width of each of the two first end patterns.

3. The touch panel according to claim 2, wherein the width of the first central pattern is 0.75 time the maximum width of each of the two first end patterns.

4. The touch panel according to claim 2, wherein the two first end patterns are arranged symmetrically about the first central pattern.

5. The touch panel according to claim 2, wherein the width of each of the two first end patterns is larger than a width of the corresponding first connection portion.

6. The touch panel according to claim 2, wherein the two first end patterns are respectively adjacent to different second electrode series.

7. The touch panel according to claim 1, wherein each of the plurality of second electrode portions comprises a second central pattern and two second end patterns, the two second end patterns are located on opposite sides of the second central pattern in the second direction, each of the two second end patterns is connected between the second central pattern and one of the plurality of second connection portions, and a width of each of the two second end patterns is gradually reduced outward from the second central pattern along the second direction.

8. The touch panel according to claim 7, wherein the second central pattern comprises two expanded segments adjacent to the two second end patterns and a reduced segment located between the two expanded segments, and a width of the reduced segment is smaller than a width of the two expanded segments.

9. The touch panel according to claim 1, wherein each of the plurality of first electrode portions comprises a first central pattern and a first end pattern located between the first central pattern and the corresponding first connection portion, each of the plurality of second electrode portions comprises a second central pattern and a second end pattern located between the second central pattern and the corresponding second connection portion, the first end pattern is spaced from the adjacent second end pattern by a first distance, the first central pattern is spaced from the adjacent second central pattern by a second distance, and the first distance is smaller than the second distance.

10. An electronic device comprising:
a display panel having a display surface; and
a touch panel located above the display surface, the touch panel comprising:
a substrate;
a plurality of first electrode series disposed on the substrate, each of the plurality of first electrode series comprising a plurality of first electrode portions and a plurality of first connection portions, each of the plurality of first connection portions connecting adjacent two of the plurality of first electrode portions in series in a first direction; and
a plurality of second electrode series disposed on the substrate, each of the plurality of second electrode series comprising a plurality of second electrode portions and a plurality of second connection portions, each of the plurality of second connection portions connecting adjacent two of the plurality of second electrode portions in series in a second direction, wherein the first direction intersects the second direction, and each of the plurality of first connection portions partially overlaps one of the plurality of second connection portions, wherein the plurality of first electrode portions and the plurality of second electrode portions are disposed in parallel on the substrate, and an entirety of an area of each of the plurality of second electrode portions is larger than an entirety of an area of each of the first electrode portions, wherein the entirety of the area of each of the plurality of second electrode portions is 2±0.2 times the entirety of the area of each of the first electrode portions.

11. The electronic device according to claim 10, wherein each of the plurality of first electrode portions comprises a first central pattern and a first end pattern located between the first central pattern and the corresponding first connection portion, each of the plurality of second electrode portions comprises a second central pattern and a second end pattern located between the second central pattern and the corresponding second connection portion, the first end pattern is spaced from the adjacent second end pattern by a first distance, the first central pattern is spaced from the adjacent second central pattern by a second distance, and the first distance is smaller than the second distance.

12. The electronic device according to claim 10, wherein each of the plurality of first electrode portions comprises a first central pattern and two first end patterns, the two first end patterns are located on opposite sides of the first central pattern in the first direction, each of the two first end patterns is connected between the first central pattern and one of the plurality of first connection portions, a width of each of the two first end patterns is gradually reduced outward from the first central pattern along the first direction, and a width of the first central pattern is smaller than a maximum width of each of the two first end patterns.

13. The electronic device according to claim 12, wherein the width of the first central pattern is 0.75 time the maximum width of each of the two first end patterns.

* * * * *